Aug. 12, 1969     J. J. GRAHAM     3,461,010
METHOD OF MAKING A CLOSED FILLED PLASTIC CONTAINER
Filed Dec. 22, 1965
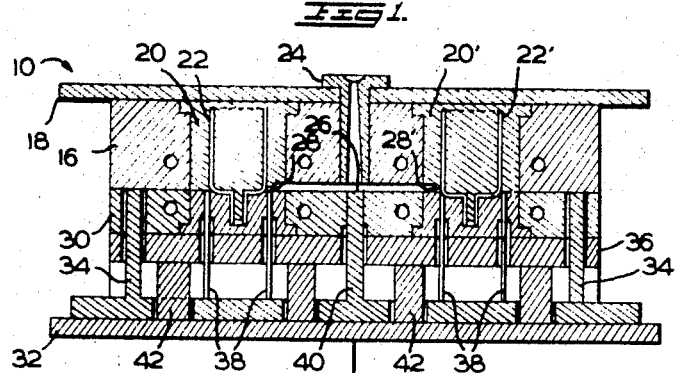
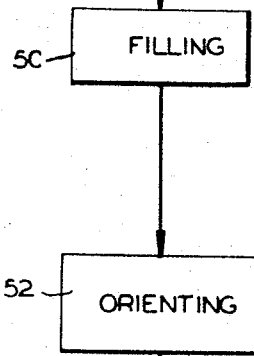
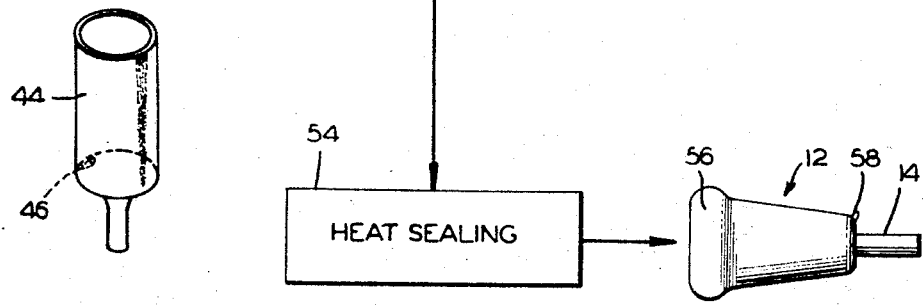
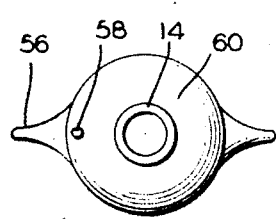
INVENTOR
JOHN J. GRAHAM
BY *Stowell & Stowell*
ATTORNEYS United States Patent Office 3,461,010
Patented Aug. 12, 1969

3,461,010
METHOD OF MAKING A CLOSED FILLED PLASTIC CONTAINER
John J. Graham, Bound Brook, N.J., assignor to Schering Corporation, Bloomfield, N.J., a corporation of New Jersey
Filed Dec. 22, 1965, Ser. No. 515,694
Int. Cl. B32b *31/14;* C09j *5/00*
U.S. Cl. 156—145                                2 Claims

ABSTRACT OF THE DISCLOSURE

In the manufacture of a closed filled generally cylindrical tubular injection molded plastic container, the container with an open end is oriented relative to a sealing station by using the molding gate mark on the container as an orientation alignment means and then open end is heat sealed at the sealing station on a diameter of the container generally coplanar with the radial plane of the gate mark.

This invention relates to improved plastic containers and to a method of making such containers.

The use of injection molded, plastic, generally cylindrical containers or tubes particularly for the packaging of liquid formulations is highly desirable. Injection molding of tubes is relatively inexpensive as compared with the cost of manufacture of equivalent plastic tubes or containers made by for example extrusion molding processes. However, it has been found that a large percentage of injection molded tubes when filled and heat sealed develop stress cracks within a short time after heat sealing. The problem is of such a severe nature that injection molded containers for liquids have not found significant acceptance as a package form.

It has been discovered that the detrimental stress cracks always occur in a plane approximately 180° from the gate or sprew mark and that the cracking occurs substantially only when the heat seal at the base of each of the generally cylindrical tubes is applied in a plane approximately 90° from the plane passing through the sprew or gate mark of the injection molded tubes. It further has been discovered that such detrimental stress cracks will not occur when the heat seals are applied generally along a diameter coplanar with the radial plane of the gate or sprew mark of injection molded tubes, thereby permitting the economic use of injection molded plastic tubes or containers for the packaging of the liquid formulations.

It has also been observed that the detrimental stress cracking phenomena is accentuated when certain materials are packaged. The particular nature of so-called stress-cracking agents is not completely understood, however, that it is known that materials displaying this property are both varied and numerous and occur in most liquid formulations of pharmaceuticals and/or medicinals.

In general, the present invention comprises the method of producing plastic packages including the steps of injection molding generally cylindrical tubular containers having at least one open end, filling the containers, orienting the filled containers and heat sealing the open end of the oriented containers such that the heat seal is generally on a diameter of the container coplanar with the radial plan of the injection molding gate of the container; and further the invention includes a generally cylindrical plastic injection molded container having one end heat sealed generally on a diameter coplanar with the radial plane of the injection molding gate.

The invention will be more particularly described with reference to the accompanying drawings wherein:

FIG. 1 is a schematic view of apparatus suitable for carrying out the process of the present invention;

FIG. 2 is a top view of a tube constructed in accordance with the teachings of the present invention; and FIG. 3 is a perspective view of an injection molded tube showing the zone in which the stress crack normally occurs.

Referring to drawings and in particular to FIG. 1, 10 generally illustrates a cross-section of a two cavity mold for injection molding of small open bottom tubular containers having closed neck portions. The mold includes a mold cavity retainer block 16, a mold mounting plate or stationary platen 18, a pair of cavity blocks 20 and 20′ each having formed therein a mold cavity 22 and 22′ respectively of identical configuration. The assembly also includes a sprue bushing 24 for directing the molding material to the transverse runner 26 which in turn feeds to the gate portions 28 and 28′ for mold cavities 22 and 22′. The injection mold includes the mold force block 30, the moving mounting plate or platen 32, knockout push back pins 34, forced retaining plate 36, knockout pins 38, sprue knockout pin 40 and support pillars 42.

While a two cavity mold block is shown in FIG. 1 it will be apparent to those skilled in the art that the mold may include many cavities all interconnected by runners to the sprue well. In operation of the injection mold a suitable plastic such as polyethylene, polypropylene, etc., is placed generally in granular form, in a hopper from which it is fed, in a predetermined quantity, to a heated chamber located in front of a hydraulically operated piston. After the mold is closed the plunger of the piston forces the plastic through the heated cylinder or chamber then through a nozzle into the sprue bushing 24 thence on through the runners into the mold cavities. Pressures up to, for example, 25,000 p.s.i. are generally used for injection. In the injection molding the hot thermoplast is injected into a cool mold thereby obviating the need for alternately heating and cooling the mold. Since the mold is cooled the plastic cools rapidly and is soon ready for ejection.

During the molding of the generally cylindrical open bottom tubes the hot thermoplast must flow from the small gate into the cavities 22 and 22′ and thence around the cavities to complete the filling process. It has been observed that where the two flowing streams of hot thermoplast flowing from the gate meet at approximately 180° from the point of entry of the plastic into the mold cavity, the slight cooling causes a line of weakness or stress line to form in a radial plane generally designated 44, 180° from the gate mark 46 as illustrated in FIG. 3 of the drawing. The stress line is not generally visible under ordinary light. However, the stress line in injected molded tubes when photographed or viewed under polarized light appears as a shadow area substantially as indicated in FIG. 3 of the drawing.

As indicated above, although there is no normally visible seam, a line of stress or weakness is formed along the line defined by the juncture of the streams of plastic flowing about the mold cavity from the sprue or gate. This stress line defines the weakest part of the injected molded tube and is the line along which stress cracks appear when the tube is filled and heat sealed along a plane running approximately 90° from the plane passing through the stress line.

As hereinabove disclosed applicant has discovered that if the heat sealing of the open or lower end of the tube is such that the heat seal is on a diameter generally coplanar with the radial plane of the gate mark the stress line formed in the injection molded container will not develop into a stress crack and such tubes can be effectively and economically employed for the dispensing of liquid formulations.

Referring further to FIG. 1 following molding, opening of the mold and ejection of the molded containers, the containers are directed to a filling station generally designated 50. From or prior to the filling station the containers are oriented with respect to a sealing station. The orientation station is generally designated 52 and any conventional orientation means may be employed in the system. The gate mark 58 provides a convenient means for aligning the individual containers in the desired manner. However, if the individual containers are not separated from their lateral runner then the runner itself can provide the key for the orientation step. Following orientation the oriented container or containers are passed to a conventional heat sealing device generally designated 54 wherein the lower open ends of the containers are forced together and heat sealed with the heat seal lying on a diameter which is generally coplanar with the radial plane of the gate mark as provided by the orienting apparatus generally shown at 52 to provide a finished structure as illustrated in 12 having a heat sealed lower end 56 and elongated closed neck portion 14. The normally closed neck portion 14 is removed such as by cutting in order to dispense the liquid formulation sealed within the container.

Referring particularly to FIG. 2 the preferred relationship between the plane of the lower heat seal 56 and the gate mark 58 is more clearly illustrated and in the illustrated form of the invention the gate mark is shown generally located towards one edge of the container on a relatively flat portion of the top 60 and radially outwardly of the neck portion 14. It will be appreciated, however, that the gate mark may appear at any position along the outer wall of the container.

Further, while in the preferred form of the invention the heat seal is shown on a diameter coplanar with the plane of the gate mark, satisfactory results are obtainable when the diameter of the heat seal is within about 45° of the plane of the gate mark. Throughout the specification and claims the term "generally coplanar" is intended to include the foregoing range.

From the foregoing description of a preferred embodiment of the present invention it will be seen that the present invention fully accomplishes the aims and objects hereinabove set forth.

I claim:

1. A method of manufacturing a closed filled generally tubular plastic package comprising injection molding a generally cylindrical tubular container having at least one open end and a molding gate mark resultant from the gate meet of the thermoplast flow; filling the container at a filling station; orienting the filled container relative to a heat sealing station by using the gate mark as an alignment means; and heat sealing the open end of the oriented container at the heat sealing station with the heat seal generally on a diameter of the container coplanar with the radial plane of the gate mark of the container.

2. A method of manufacturing a closed filled generally tubular plastic package comprising injection molding a generally cylindrical tubular container having at least one open end by directing a heated thermoplastic composition into a mold from a point source of the molding composition with the container having a molding gate mark resultant from the gate meet of the thermoplastic composition in the mold; filling the container; orienting the filled container relative to a heat sealing station by using the gate mark as an alignment means; and heat sealing the open end of the container on a diameter of the container substantially coplanar with the radial plane of the injection molding gate mark of the container.

References Cited
UNITED STATES PATENTS 3,161,525 12/1964 Hey _____ 264—328 XR
2,962,843 12/1960 Hoeltzer et al. _____ 156—145

PHILIP DIER, Primary Examiner

U.S. Cl. X.R.

53—39, 140; 156—306; 229—48; 264—248